United States Patent
Sanning et al.

[11] Patent Number: 5,448,766
[45] Date of Patent: Sep. 5, 1995

[54] METHOD AND APPARATUS FOR AUTOMATICALLY REPLACING A NON-FUNCTIONING TRANSMITTER IN A RADIO COMMUNICATION SYSTEM

[75] Inventors: Wayne Sanning, Schaumburg, Ill.; Michael D. Cross, Brunswick, Ohio; Thaddeus Jakala, Tinley Park, Ill.

[73] Assignee: Motorola, Inc., Schaumburg, Ill.

[21] Appl. No.: 58,883

[22] Filed: May 10, 1993

[51] Int. Cl.⁶ .............................................. H04B 1/02
[52] U.S. Cl. ........................................ 455/103; 455/8; 455/9; 455/67.1
[58] Field of Search ............... 455/103, 8, 9, 51.2, 455/67.1, 115; 371/8.2, 9.1, 11.2, 7; 375/3, 3.1

[56] References Cited

U.S. PATENT DOCUMENTS

| | | | |
|---|---|---|---|
| 4,039,947 | 8/1977 | Miedema | 455/8 |
| 4,642,633 | 2/1987 | Dunkerton et al. | |
| 4,696,052 | 9/1987 | Breeden | 455/51.2 |
| 4,775,976 | 10/1988 | Yokoyama | 371/9.1 |
| 4,984,240 | 1/1991 | Keren-Zvi et al. | 371/8.2 |

FOREIGN PATENT DOCUMENTS

0120917 5/1991 Japan ............................... 455/8

OTHER PUBLICATIONS

Lee, William, Mobile Cellular Telecommunications System, 1989, pp. 8–9.

Primary Examiner—Edward F. Urban
Assistant Examiner—Doris To
Attorney, Agent, or Firm—Kelly A. Gardner; John H. Moore; Daniel K. Nichols

[57] ABSTRACT

A radio communication system (100) includes a terminal/controller (110, 112) for transmitting an enable signal, data associated with the enable signal, and a disable signal following the data. A normally operating transmitter (105, 107) coupled to the terminal/controller (110, 112) receives, when operating normally, the enable signal and transmits the data associated therewith as a radio frequency (RF) signal. The normally operating transmitter (105, 107) further generates status information for indicating that the normally operating transmitter (105, 107) is functioning, wherein the status information includes at least the enable signal and the disable signal. The radio communication system (100) further includes a redundant transmitter (115) coupled to the normally operating transmitter (105, 107) and the terminal/controller (110, 112) for receiving the status information and determining therefrom whether the normally operating transmitter (105, 107) is functioning. The redundant transmitter (115), in response to determining that the normally operating transmitter (105, 107) has ceased functioning subsequent to reception of the enable signal, automatically transmits the data associated with the enable signal as the RF signal.

6 Claims, 4 Drawing Sheets

METHOD AND APPARATUS FOR AUTOMATICALLY REPLACING A NON-FUNCTIONING TRANSMITTER IN A RADIO COMMUNICATION SYSTEM

FIELD OF THE INVENTION

This invention relates in general to radio communication systems, and more specifically to a radio communication system in which a non-functioning transmitter can be replaced by another transmitter.

BACKGROUND OF THE INVENTION

Radio communication systems, such as paging systems, are well known in the art. Conventional paging systems often include multiple transmitters for transmitting radio frequency signals at various geographic sites. Typically, a paging terminal/controller included in the paging system receives message information from data entry devices or from conventional wired telephones via a telephone network, such as the public switched telephone network. After a predetermined time period, or after a specified amount of message information has been collected, the paging terminal/controller encodes the message information into selective call messages utilizing a suitable paging format, such as GSC (Golay Sequential Code) or POCSAG (Post Office Code Standardization Advisory Group). The paging terminal/controller then enables all or a selected group of the transmitters utilizing an "enable" signal and subsequently provides the selective call messages to the enabled transmitters. When transmission of the messages is complete, the paging terminal/controller disables the transmitters to indicate that all of the messages have been transmitted. The transmitters thereafter modulate the messages for transmission over predetermined RF channels. The messages are subsequently received by radio communication devices, such as pagers, carried by system subscribers.

To ensure that system subscribers miss as few messages as possible, some conventional paging systems further include a redundant transmitter, which serves as a replacement for a transmitter that is non-functional for one reason or another, e.g., power to the transmitter is lost or the transmitter is under repair. When it is switched in to replace the non-functional transmitter, the redundant transmitter monitors the link to the paging terminal/controller to await detection of the next-transmitted enable signal with which the paging terminal/controller enables, or "keys up", the transmitters. In response to reception of the next enable signal, the redundant transmitter modulates and transmits the subsequently provided messages over the RF channel utilized by the non-functional transmitter. In this manner, the system subscribers which would normally receive messages from the non-functional transmitter instead conveniently receive messages from the redundant transmitter.

Subscribers to a paging system utilizing this replacement method, however, can still miss messages when a transmitter ceases functioning after being keyed up, i.e., enabled. In this situation, any encoded messages which follow the provided enable signal are lost because the redundant transmitter is not able to transmit any messages until after reception of the next enable signal provided by the paging terminal/controller. This problem is especially severe in paging systems in which messages collected over a large period of time or a large number of messages are provided to the transmitters in a single long transmission following an enable signal. In this situation, subscribers can be out of service for a long period of time while the redundant transmitter waits for reception of a subsequent enable signal.

Thus, what is needed is an improved method, in a paging system, for replacing a transmitter which has ceases functioning. This method should ensure that system subscribers do not miss selective call messages which would normally have been transmitted by the non-functioning transmitter.

SUMMARY OF THE INVENTION

Thereafter, the first transmitter receives a disable signal provided by the terminal/controller which indicates that no further data associated with the enable signal will be provided by the terminal/controller, and in response to reception of the disable signal, the first transmitter clears the flag from memory.

A radio communication system comprises a terminal/controller for transmitting an enable signal, data associated with the enable signal, and a disable signal following the data. A normally operating transmitter is coupled to the terminal/controller for receiving the enable signal and transmitting, when operating normally, the data associated therewith as a radio frequency (RF) signal. The normally operating transmitter generates status information for indicating that the normally operating transmitter is functioning. The status information includes at least the enable signal and the disable signal.

The radio communication system further includes a redundant transmitter that comprises receiving circuitry coupled to the normally operating transmitter for receiving therefrom the status information and a memory coupled to the receiving circuitry for storing a flag set in response to reception of the enable signal by the receiving means and for clearing the flag in response to reception of the disable signal by the receiving means. Determining circuitry included in the redundant transmitter determines that the normally operating transmitter has ceased functioning subsequent to receiving the enable signal by detecting the absence of a predetermined signal in the status information when the flag is set in the memory. Transmitting circuitry coupled to the determining circuitry and the terminal/controller automatically transmits, in response to a determination that the normally operating transmitter has ceased functioning, the data associated with the enable signal as the RF signal.

DESCRIPTION OF A PREFERRED EMBODIMENT

Figure 1:
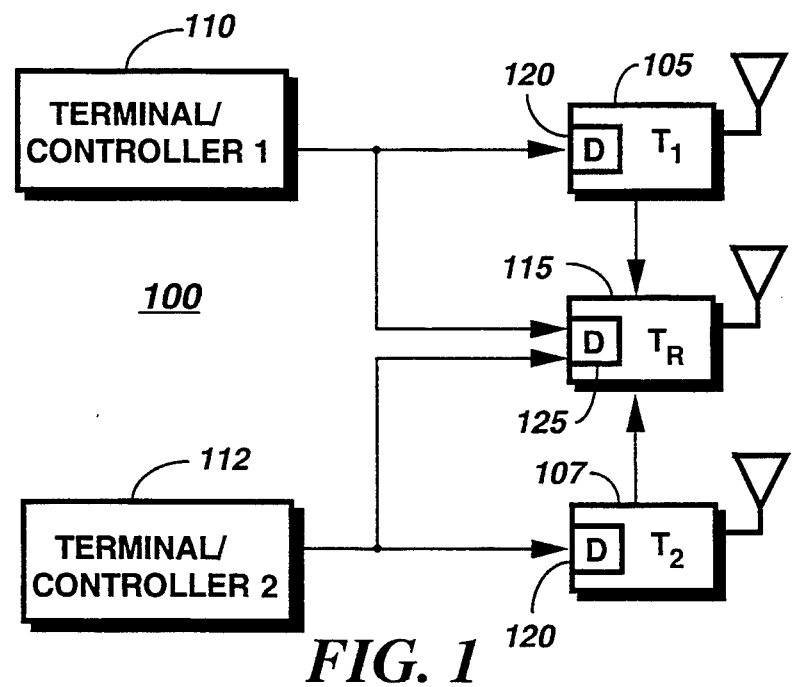
FIG. 1 is a block diagram of a radio communication system in accordance with the present invention.

FIG. 1 is a diagram of a radio communication system 100, such as a simulcast paging system, comprising a plurality of normally operating transmitters 105, 107 controlled by terminal/controllers 110, 112 coupled thereto. It will be appreciated that each normally operating transmitter 105, 107 which transmits on a different frequency is controlled by a different terminal/controller 110, 112. For instance, a first normally operating transmitter ($T_1$) 105 which transmits on a first frequency is preferably controlled by a first transmitter/controller ($TC_1$) 110, and a second normally operating transmitter ($T_2$) 107 which transmits on a second frequency is controlled by a second transmitter/controller ($TC_2$) 112. Additionally, the radio communication system 100 comprises a redundant transmitter 115 for replacing one of the normally operating transmitters 105, 107 when the transmitter 105 or 107 is non-functional, such as when power to the transmitter 105 or 107 has been lost or when the transmitter 105 or 107 has been disabled for repair or maintenance.

Each terminal/controller 110, 112 is coupled both to the redundant transmitter 115 and the normally operating transmitters 105, 107 which it controls. This coupling is provided, for example, by a radio frequency (RF) communication link or dedicated wireline. Each terminal/controller 110, 112 collects, in a conventional manner, selective call messages, which are stored until a predetermined number of messages is collected or until expiration of a predetermined time period. After the predetermined number is collected or after expiration of the time period, each terminal/controller 110, 112 provides control information, such as an "enable" signal, and data information, such as the selective call messages, over the communication link. The enable signal, which is intended to enable, i.e., key up, the normally operating transmitters 105, 107 to which it is coupled, is preferably followed by the selective call messages. Subsequently, the normally operating transmitters 105, 107, if operating correctly, modulate the selective call messages for transmission as RF signals, which, in a paging system, are received by portable paging devices carried by system subscribers located within the coverage range of at least one of the transmitters 105, 107.

Each of the normally operating transmitters 105, 107 is also coupled, by an RF link or dedicated wireline, to the redundant transmitter 115 such that the redundant transmitter 115 can determine whether a normally operating transmitter 105, 107 has ceased functioning. According to the present invention, in this situation, the redundant transmitter 115 immediately begins modulating and transmitting the selective call messages associated with the received enable signal on the frequency at which the non-functional transmitter 105, 107 usually transmits. System subscribers therefore conveniently receive all of the selective call messages associated with every enable signal, even when a transmitter 105, 107 included in the system 100 ceases functioning, i.e., "goes down".

Conversely, in conventional systems, a redundant transmitter cannot immediately begin transmitting selective call messages intended for transmission by a non-functional transmitter. Instead, the redundant transmitter must first determine that a normally operating transmitter is down, i.e., not functioning, and then wait for reception of the next enable signal and the selective call messages provided thereafter. As a result, if a normally operating transmitter ceases functioning after reception of an enable signal, the selective call messages associated with the enable signal are not transmitted at all, and only selective call messages associated with a subsequent enable signal are transmitted by the redundant transmitter.

In simulcast paging systems, as is well known to one of ordinary skill in the art, transmission of the selective call messages provided by the terminal/controllers 110, 112 is delayed at each of the transmitters 105, 107, 115 by a delay circuit 120, 125 included therein. The delay circuit 120, 125 of each transmitter 105, 107, 115 is adjusted to account for propagation delay such that each transmitter 105, 107, 115 transmits the selective call messages at substantially the same time. Therefore, transmitters 105, 107, 115 which transmit on the same frequency do not interfere with each other, and system subscribers located in the coverage areas of two or more transmitters 105, 107, 115 transmitting on the same frequency do not miss selective call messages due to interference.

Figure 2:
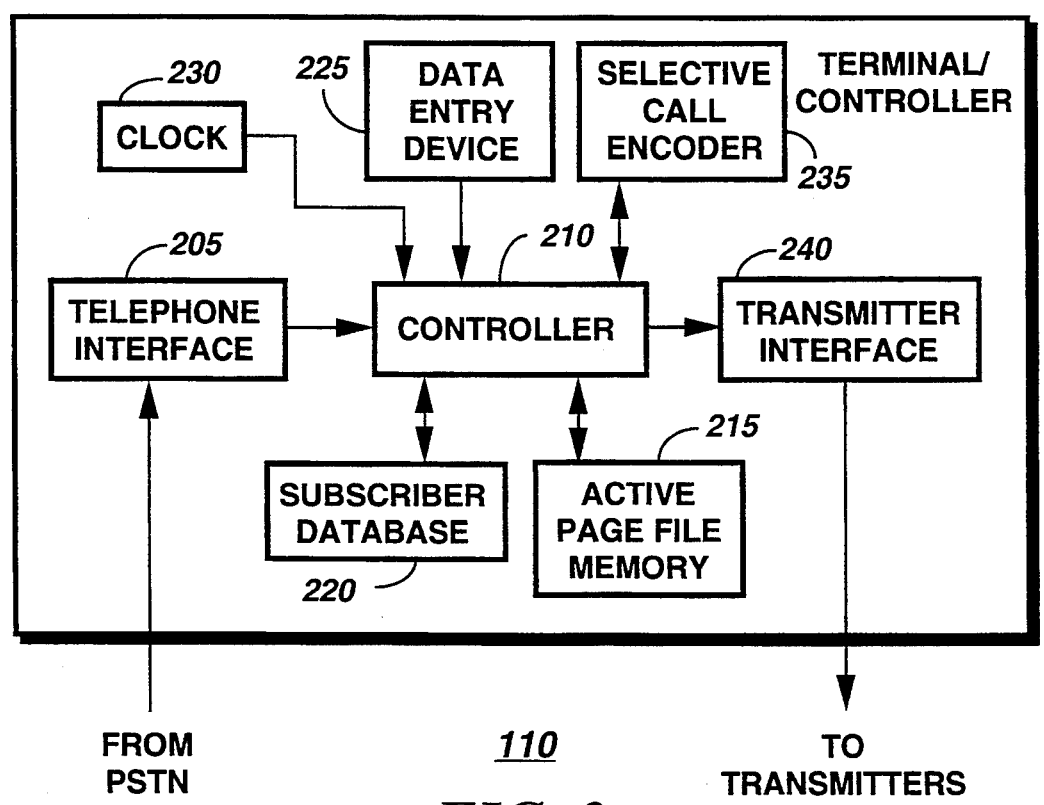
FIG. 2 is an electrical block diagram of a terminal/controller included in the radio communication system of FIG. 1 in accordance with the present invention.

Referring next to FIG. 2, an electrical block diagram of the terminal/controller 110 is depicted. It will be appreciated that the terminal/controller 112 (FIG. 1) is constructed and functions in a similar manner. The terminal/controller 110, if utilized in a paging system, comprises a telephone interface 205 for receiving selective call messages over a telephone network, such as the public switched telephone network (PSTN). The terminal/controller 110 further comprises a controller 210 for processing the received selective call messages. Coupled to the controller 210 is an active page file memory 215, which temporarily stores the received selective call messages, and a subscriber database 220, which stores a listing of system subscribers. The listing can be periodically updated through use of a data entry device 225, such as a keyboard, coupled to the controller 210.

Further included in the terminal/controller 110 is a clock 230 for generating timing signals. The controller 210 may, for example, utilize the timing signals to determine when a periodic time period has expired, in response to which the selective call messages stored in the active page file memory 215 are retrieved and provided to a selective call encoder 235 coupled to the controller 210. The selective call encoder 235 is employed to encode the selective call messages into a suitable paging format, such as POCSAG (Post Office Code Standardization Advisory Group) or GSC (Golay Sequential Code).

Typically, after the selective call messages are encoded, the controller 210 provides a stream of data to a transmitter interface 240 for converting the data into an information signal suitable for transmission to the transmitters 105, 115. When the terminal/controller 110 is coupled to the transmitters 105, 115 by an RF link, for example, the transmitter interface 240 comprises circuitry for modulating the data for transmission as an RF signal. When the terminal/controller 110 is coupled to the transmitters 105, 115 by telephone lines, the transmitter interface 240 may simply comprise a modem for generating telephone signals. The information signal provided by the terminal/controller 110 preferably includes, as described above, an enable signal followed by the encoded selective call messages. Transmission of the selective call messages is followed by a "disable" signal, which disables the transmitters 105, 115.

Each of the terminal/controllers 110, 112 can be implemented, for example, be an MPS-2000 terminal coupled to an ASC-1500 transmitter controller, each of which is manufactured by Motorola, Inc. of Schaumburg, Ill.

Figure 3:
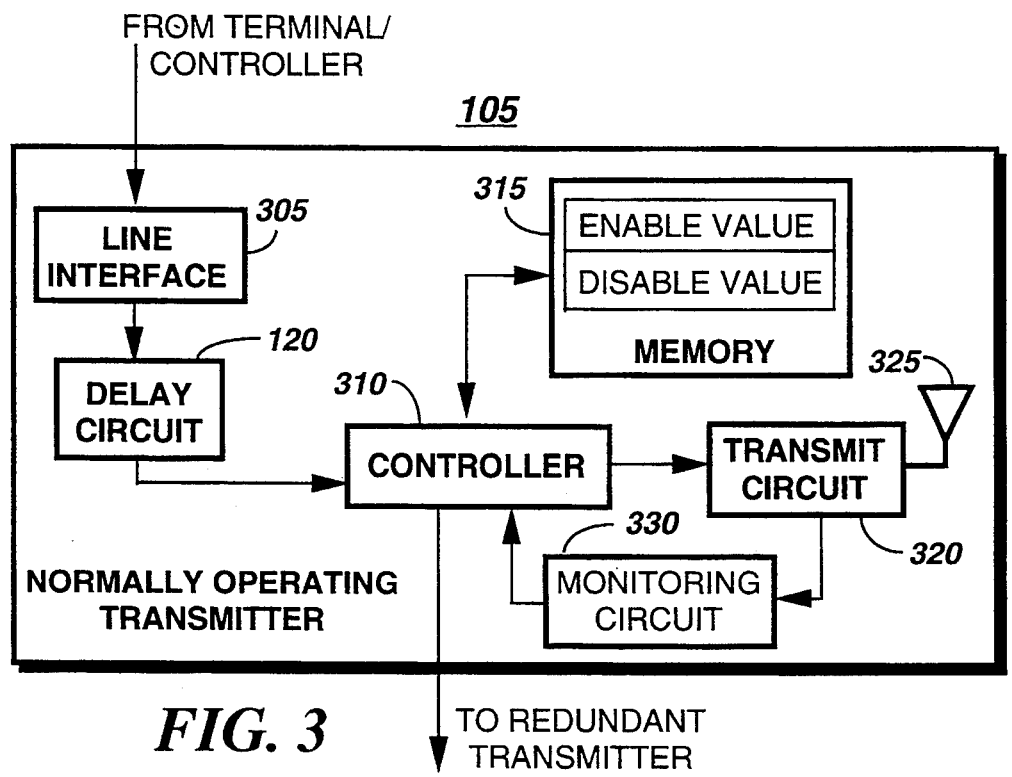
FIG. 3 is an electrical block diagram of a normally operating transmitter controlled by the terminal/controller of FIG. 2 in accordance with the present invention.

FIG. 3 is an electrical block diagram of a normally operating transmitter, such as normally operating transmitter 105 (FIG. 1), included in the radio communication system 100. The transmitter 105 comprises a line interface 305 for converting the information signal provided by the terminal/controller 110 to a digital signal, which is thereafter delayed, in a simulcast system, by a delay circuit 120. The transmitter 105 further comprises a controller 310 coupled to the delay circuit 120 for receiving and processing the digital signal to recover therefrom the enable signal, the selective call messages, and subsequent disable signal.

In response to reception of the digital signal, the controller 310 determines whether a sequence of bits included therein corresponds to a predetermined "enable value" stored in a memory 315. When the enable value is recognized, the controller 310 forwards the subsequent data, i.e., the selective call messages, until the disable signal is received. Coupled to the controller 310 is a transmit circuit 320 for receiving the forwarded selective call messages from the controller 310 and modulating the selective call messages to generate an RF signal at a predetermined frequency. The RF signal is thereafter transmitted over a coverage area by an antenna 325 coupled to the transmit circuit 320.

In accordance with the present invention, further included in the transmitter 105 is a monitoring circuit 330 coupled to the transmit circuit 320 for indicating to the controller 310 whether the transmit circuit 320 is functioning. The monitoring circuit 330 may be, for example, a sensor having an output which goes high when data is on a line to, from, or within the transmit circuit 320. When the transmit circuit 320 is not functioning, such as when an enable signal has not been received or when the transmit circuit 320 malfunctions, no signal, i.e., zero volts, is generated by the sensor. The output of the monitoring circuit 330 is provided to the controller 310.

As described above, the normally operating transmitter 105 is coupled to the redundant transmitter 115 by a communication link, such as an RF link or dedicated wireline, and provides status information thereto. The status information preferably includes at least enable and disable signals received by the transmitter 105, by which the redundant transmitter 115 determines the status, i.e., enabled or disabled, of the transmitter 105. Additionally, according to the present invention, the status information includes an indication that the transmitter 105 is functioning. Normally, for instance, the transmitter 105 might transmit the enable and disable signals, when present, and transmit a predetermined signal in between transmissions of the enable and disable signals to indicate that the transmitter 105 is functioning although no enable or disable signals are being transmitted. In this manner, the redundant transmitter 115 could easily determine that the transmitter 105 is not functioning if neither the enable or disable signals nor the predetermined signal is received over the communication link.

Figure 4:
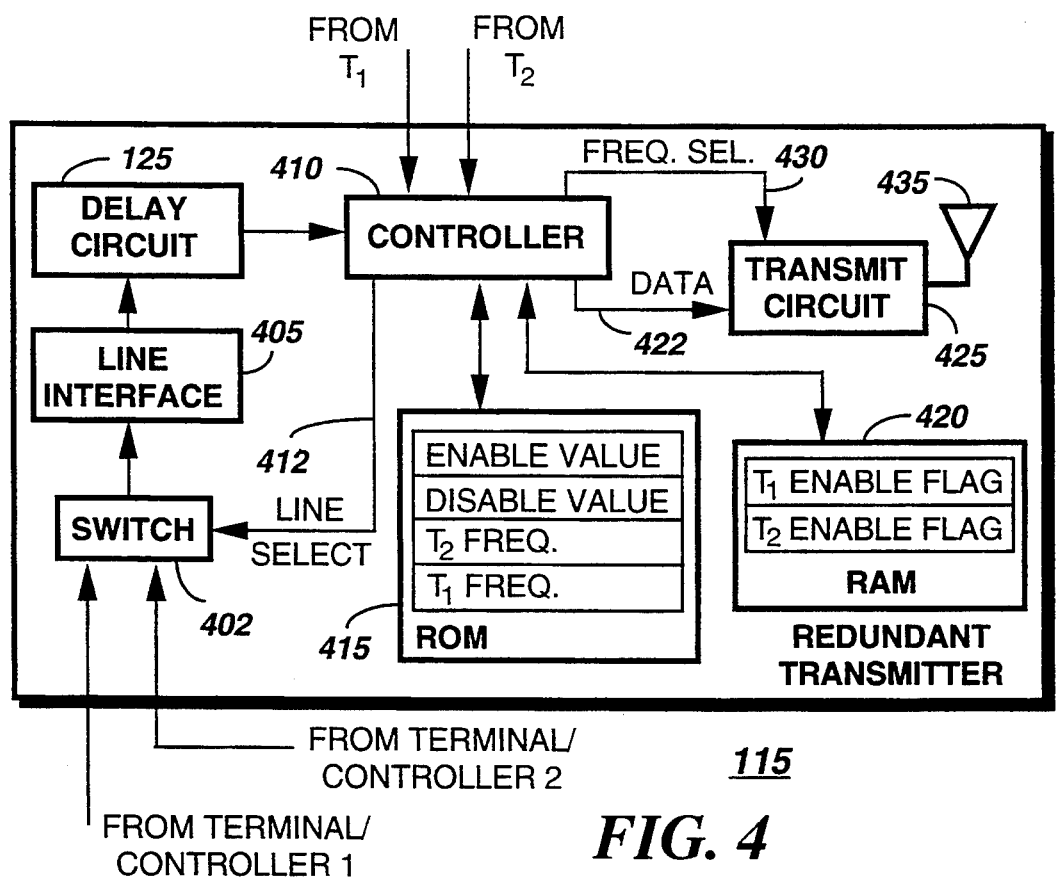
FIG. 4 is an electrical block diagram of a redundant transmitter controlled by the terminal/controller of FIG. 2 in accordance with the present invention.

FIG. 4 is an electrical block diagram of the redundant transmitter 115, which comprises a switch 402 for switching between signals received from the terminal/controllers 110, 112 (FIG. 1) and a line interface 405 for converting information, such as the enable signal, selective call messages, and disable signal, provided by the terminal/controllers 110, 112 into a signal, e.g., a digital signal, suitable for processing by the redundant transmitter 115. Further included in the redundant transmitter 115 is a delay circuit 125 coupled to the line interface 405 for delaying the digital signal by a predetermined amount of time and a controller 410 for processing the delayed signal and for controlling the switch 402 via a line select bus 412. According to the present invention, the controller 410 may be a microcomputer, such as an MC68HC05 microprocessor manufactured by Motorola, Inc. of Schaumburg, Ill. Alternatively, the controller 410 can be hard-wired logic capable of performing equivalent operations.

A read only memory (ROM) 415 is coupled to the controller 410 for storing subroutines executed by the controller 410 during operation of the redundant transmitter 115 and for storing an enable value and a disable value by which the controller 410 recognizes the enable and disable signals provided by the terminal/controllers 110, 112 and the normally operating transmitters 105, 107. Additionally, the ROM 415 stores the frequencies at which the transmitters 105, 107 operate. A random access memory (RAM) 420 coupled to the controller 410 stores temporary values derived during operation of the redundant transmitter 115. More specifically, the RAM 420 is employed to store flags, which are set by the controller 410 when enable signals are received by the redundant transmitter 115 from the terminal/controllers 110, 112 and the normally operating transmitters 105, 107. It will be appreciated by one of ordinary skill in the art that other memory devices, rather than the RAM 420 and the ROM 415, can be utilized to perform equivalent functions.

The controller 410, in accordance with the present invention, is coupled to the normally operating transmitters 105, 107 for receiving the status information therefrom. Preferably, each normally operating transmitter 105, 107 is coupled to a single port of the controller 410 such that the controller 410 can recognize from which transmitter 105, 107 the status information originates. It may be appreciated that only two transmitters 105, 107 are coupled to ports of the controller 410 for illustrative purposes only, and that any number of transmitters 105, 107 can be coupled to the controller 410 during actual operation of the radio communication system 100. It may be further appreciated that, when the status information is transmitted via an RF link, demodulating circuitry is included in the redundant transmitter 115 for demodulating the received status information.

According to an alternate embodiment (not shown) of the present invention, the terminal/controllers 110, 112, rather than the redundant transmitter 115, could monitor the normally operating transmitters 105, 107 in the system 100 to determine when a transmitter 105, 107 has gone down, i.e., ceased functioning, and thereby eliminate the communication links between the redundant transmitter 115 and the normally operating transmitters 105, 107. In this embodiment, the terminal/controllers 110, 112 could, when a transmitter 105, 107 goes down, provide to the redundant transmitter 115 an additional signal including information conveying which transmitter 105, 107 has ceased functioning.

As shown in FIG. 4, the controller 410 is further coupled, via a data line 422, to a transmit circuit 425 for modulating selective call messages provided thereto by the controller 410 when a normally operating transmitter 105, 107 is non-functional. Additionally, when a normally operating transmitter 105 or 107 is non-functional, the controller 410 also provides a frequency selection signal, via a frequency selection line 430, to the transmit circuit 425, in response to which the transmit circuit 425 modulates the selective call messages to generate an RF signal at the frequency indicated by the controller 410. The selective call messages are thereafter transmitted by an antenna 435 coupled to the transmit circuit 425.

Figure 5:
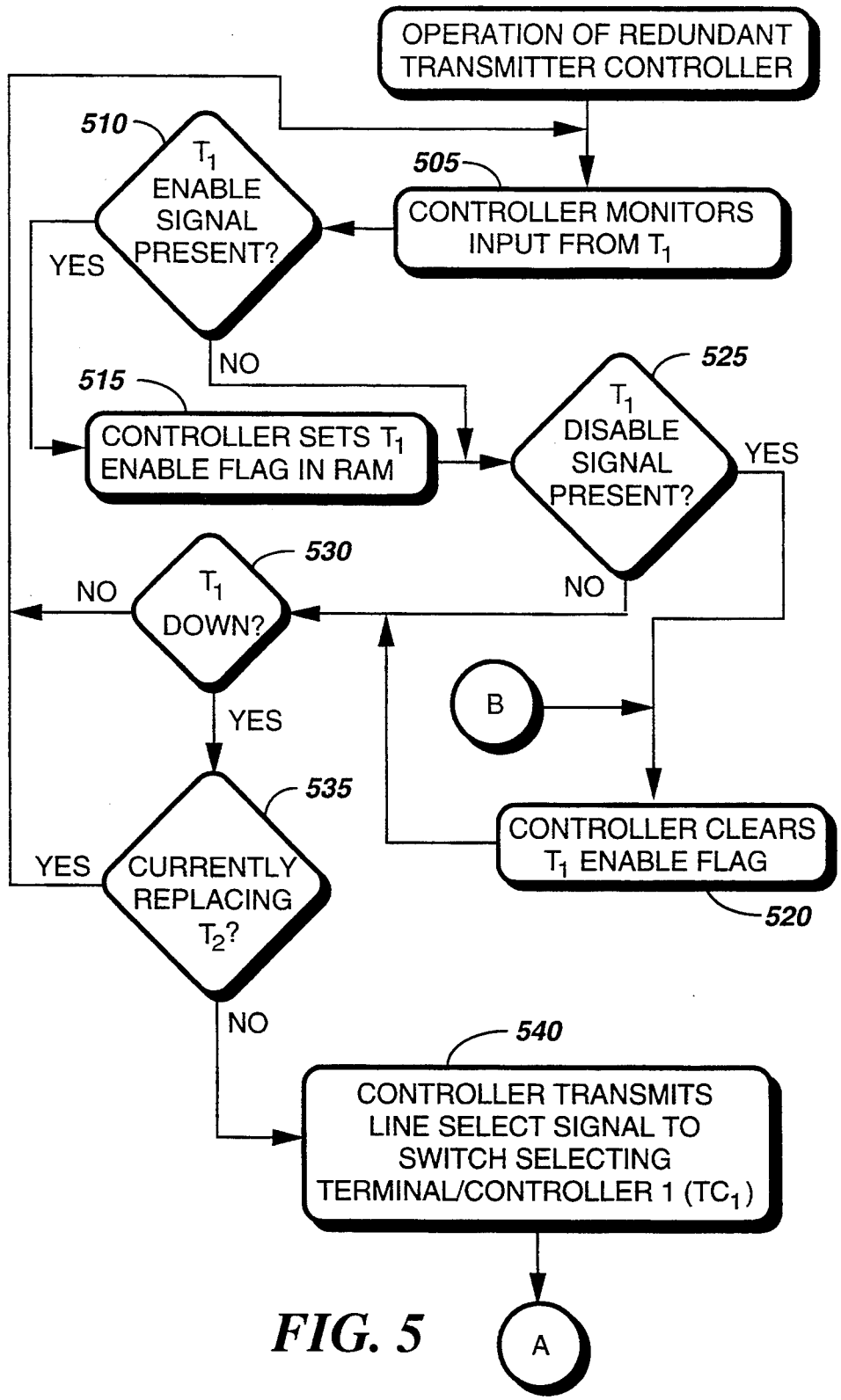
FIGS. 5 and 6 are flowcharts illustrating the operation of a controller included within the redundant transmitter of FIG. 4 in accordance with the present invention.
Figure 6:
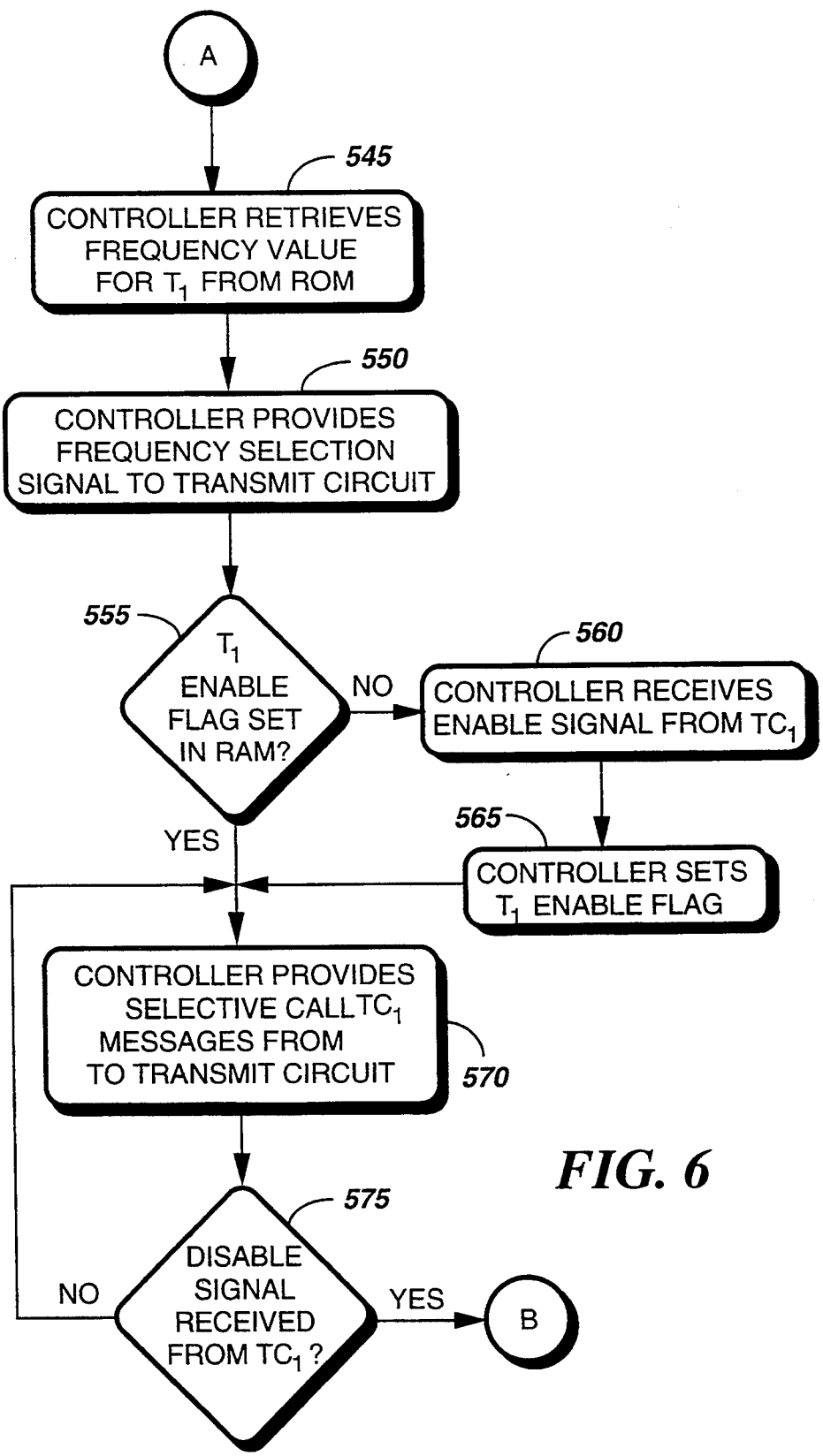

Referring next to FIGS. 5 and 6, flowcharts illustrate the operation of the controller 410 (FIG. 4) of the redundant transmitter 115 in accordance with the present invention. Upon receiving power, the controller 410 monitors, at step 505, the status information provided by the normally operating transmitters 105, 107. It will be appreciated that, in order to simplify the following discussion, the flowcharts of FIGS. 5 and 6 depict the operation of the controller 410 when monitoring and processing inputs from only a first normally operating transmitter ($T_1$) 105. During actual operation, however, the controller 410 preferably monitors and processes inputs from all of the normally operating transmitters 105, 107 to which it is coupled.

When, at step 510, the controller 410 recognizes an enable signal included within the status information provided by $T_1$ 105, a flag ($T_1$ enable flag) associated with $T_1$ 105 is set in the RAM 420 at step 515. Conversely, the flag is cleared, at step 520, in response to reception of a disable signal, at step 525.

The controller 410 further monitors the status information provided by $T_1$ 105 to determine whether the predetermined signal, indicating that $T_1$ 105 is operating normally, is present. When present, at step 530, the controller 410 continues to monitor, at step 505, the input from $T_1$ 105. When, at step 530, the predetermined signal is not present and enable and disable signals are also not present, the controller 410 determines that $T_1$ 105 is down. Subsequently, the redundant transmitter 115 replaces $T_1$ 105 when it is further determined, at step 535, that another normally operating transmitter ($T_2$) 107 is not currently being replaced. If the controller 410 is not being utilized to replace another transmitter 107, a line select signal is provided, at step 540, to the switch 402 (FIG. 4). The line select signal directs the switch 402 to forward the signals provided by the first terminal/controller ($TC_1$) 110, which normally controls $T_1$ 105. Additionally, when the redundant transmitter 115 is to replace $T_1$ 105, the controller 410 retrieves, at step 545, the frequency value for $T_1$ 105 from the ROM 415 and generates an appropriate frequency selection signal. The frequency selection signal is provided, at step 550, to the transmit circuit 425.

Thereafter, the controller 410 determines, at step 555, whether the $T_1$ enable flag is currently set, indicating that an enable signal has been previously received from $T_1$ 105. If not, the controller 410 waits to receive, at step 560, an enable signal from $TC_1$ 110, which is now coupled to the controller 410 via the switch 402, the delay circuit 125, and the line interface 405. In response to reception of the enable signal, the controller 410 sets the enable flag, at step 565. The selective call messages intended for transmission by $T_1$ 105 are subsequently provided, at step 570, to the transmit circuit 425 for transmission therefrom at the frequency on which $T_1$ 105 normally operates. When, at step 575, a disable signal from $TC_1$ 110 is received by the controller 410, the $T_1$ enable flag is cleared, at step 520, and operation of the controller 410 resumes therefrom. At this point, if $T_1$ 105 is no longer down, the redundant transmitter 115 is available to replace any other normally operating transmitter 107 to which it is coupled.

In summary, the radio communication system as described above includes a redundant transmitter for immediately replacing a normally operating transmitter that ceases functioning for one reason or another. Subsequent to reception of an enable signal provided to all the transmitters by a terminal/controller, the redundant transmitter monitors the normally operating transmitters included in the system. When a normally operating transmitter ceases functioning after reception of an enable signal, the redundant transmitter automatically begins transmitting the selective call messages associated with the previously-received enable signal on the frequency assigned to the non-functioning transmitter. As a result, system subscribers are advantageously prevented from missing messages due to a non-functioning transmitter.

In conventional radio communication systems, on the other hand, a redundant transmitter, in response to detecting a non-functional transmitter, waits until reception of a subsequent enable signal before replacing the non-functional transmitter. Therefore, selective call messages are not received by system subscribers until the terminal/controller controlling the transmitters sends a subsequent enable signal, followed by a next batch of selective call messages, to the transmitters in the system. This is especially inconvenient when transmissions from the terminal/controller are very long, e.g., ten to twenty minutes in length, in which case system subscribers could miss a large number of messages when a transmitter ceases functioning.

It may be appreciated by now that there has been provided a method and apparatus for immediately replacing a non-functioning transmitter such that system subscribers do not miss selective call messages intended for transmission by the non-functioning transmitter.

What is claimed is:

1. A radio communication system comprising:
   a terminal/controller for transmitting an enable signal, data associated with the enable signal, and a disable signal following the data;
   a normally operating transmitter coupled to the terminal/controller for receiving the enable signal and transmitting, when operating normally, the data associated therewith as a radio frequency (RF) signal, wherein the normally operating transmitter generates status information for indicating that the normally operating transmitter is functioning, the status information including at least the enable signal and the disable signal; and
   a redundant transmitter, comprising:
   receiving means coupled to the normally operating transmitter for receiving therefrom the status information;
   a memory coupled to the receiving means for storing a flag set in response to reception of the enable signal by the receiving means and for clearing the flag in response to reception of the disable signal by the receiving means;
   determining means coupled to the receiving means and the memory for determining that the normally operating transmitter has ceased functioning subsequent to receiving the enable signal by detecting the absence of a predetermined signal in the status information when the flag is stored in the memory; and transmitting means coupled to the determining means and the terminal/controller for automatically transmitting, in response to determining that the normally operating transmitter has ceased functioning, the data associated with the enable signal as the RF signal.

2. The radio communication system according to claim 1, wherein the transmitting means comprises an interface for receiving the data and a transmit circuit for modulating the data to generate the RF signal for transmission therefrom at a frequency normally utilized by the normally operating transmitter, wherein the frequency normally utilized by the normally operating transmitter is stored by the redundant transmitter.

3. The radio communication system according to claim 2, wherein the determining means comprises a controller for setting and clearing the flag in the memory, for providing the data from the interface to the transmit circuit, and for switching the transmit circuit to the frequency normally utilized by the normally operating transmitter.

4. The radio communication system according to claim 3, wherein the receiving means is included within the controller.

5. The radio communication system according to claim 3, wherein the memory comprises a random access memory (RAM).

6. The radio communication system according to claim 3, further comprising an antenna coupled to the transmit circuit for broadcasting the RF signal at the frequency normally utilized by the normally operating transmitter.

* * * * *